United States Patent
Xiao et al.

(10) Patent No.: US 10,208,693 B2
(45) Date of Patent: Feb. 19, 2019

(54) METHOD AND SYSTEM TO MITIGATE THROTTLE DEGRADATION

(71) Applicant: Ford Global Technologies, LLC, Dearborn, MI (US)

(72) Inventors: Baitao Xiao, Canton, MI (US); Hamid-Reza Ossareh, Ann Arbor, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 14/925,377

(22) Filed: Oct. 28, 2015

(65) Prior Publication Data

US 2017/0122241 A1   May 4, 2017

(51) Int. Cl.

| F02D 41/22 | (2006.01) |
| F02B 37/18 | (2006.01) |
| F02D 9/02 | (2006.01) |
| F02D 41/00 | (2006.01) |
| F02D 11/10 | (2006.01) |
| F02D 23/00 | (2006.01) |

(52) U.S. Cl.
CPC .......... *F02D 41/221* (2013.01); *F02B 37/183* (2013.01); *F02D 9/02* (2013.01); *F02D 11/107* (2013.01); *F02D 23/00* (2013.01); *F02D 41/0007* (2013.01); *F02D 2009/022* (2013.01); *F02D 2009/0213* (2013.01); *F02D 2009/0215* (2013.01); *F02D 2009/0228* (2013.01); *F02D 2009/0277* (2013.01); *F02D 2041/227* (2013.01); *F02D 2200/0404* (2013.01); *F02D 2200/0406* (2013.01); *Y02T 10/144* (2013.01); *Y02T 10/40* (2013.01)

(58) Field of Classification Search
CPC ....... F02D 41/221222; F02D 2041/227; F02D 9/02; F02D 2009/0201; F02D 2009/0213; F02D 2009/0228; F02D 2009/0235; F02D 2009/0277; F02D 41/007; F02D 23/00
USPC ........ 123/198 D, 397, 399, 690, 559.1, 565; 701/107
See application file for complete search history.

(56) References Cited

U.S. PATENT DOCUMENTS

| 6,851,304 | B2 | 2/2005 | Cullen et al. | |
| 6,938,420 | B2 * | 9/2005 | Kawamura | F02B 33/34 123/562 |
| 6,945,221 | B2 * | 9/2005 | Baeuerle | F02B 33/446 123/319 |
| 7,434,649 | B2 * | 10/2008 | Bolduc | B60R 25/042 180/279 |
| 7,631,552 | B2 * | 12/2009 | Keski-Hynnila | G01M 15/05 73/114.74 |
| 7,958,730 | B2 | 6/2011 | Stewart | |
| 8,176,735 | B2 | 5/2012 | Komatsu | |

(Continued)

FOREIGN PATENT DOCUMENTS

JP        2008075545 A   *   4/2008

*Primary Examiner* — Erick R Solis
*Assistant Examiner* — Robert A Werner
(74) *Attorney, Agent, or Firm* — Julia Voutyras; McCoy Russell LLP (57) ABSTRACT

Methods and systems for operating an engine that includes an electrically operated throttle are disclosed. In one example, mitigating actions are taken in response to degradation of the electrically operated throttle so that the engine may be operated in a way that allows a driver to reach a service area.

19 Claims, 5 Drawing Sheets

(56) References Cited

U.S. PATENT DOCUMENTS

| | | |
|---|---|---|
| 8,359,858 B2 | 1/2013 | Pursifull |
| 2012/0029794 A1 | 2/2012 | Tufail et al. |
| 2014/0127002 A1 | 5/2014 | Joergl et al. |
| 2016/0230735 A1* | 8/2016 | Tanaka .................. F02D 41/042 |

* cited by examiner

METHOD AND SYSTEM TO MITIGATE THROTTLE DEGRADATION

BACKGROUND/SUMMARY

An engine may include an electronically operated throttle to regulate air flow into the engine. The throttle may open for greater driver demand torques and close for lesser driver demand torques. The throttle's position may be monitored and corrected via one or more throttle position sensors. It may be possible for one or more throttle position sensors to exhibit degradation. The degradation may make it more difficult to achieve a desired level of throttle control performance. One way to control the throttle in the presence of a perceived throttle sensor degradation is to command the throttle to a substantially closed position (e.g., open less than five percent of full range) or to limit an opening amount of the throttle. However, limiting a throttle to a small opening amount may make it more difficult for a driver of the vehicle to reach a service location.

The inventors herein have recognized the above-mentioned disadvantages and have developed a method for operating an engine via a controller in combination with a throttle, comprising: commanding the throttle to a position via the controller in response to an indication of throttle degradation; and activating an electric compressor via the controller in response to the indication of throttle degradation.

By activating an electric compressor and commanding an engine throttle open, it may be possible to provide the technical result of controlling engine air flow in response to a driver demand torque in the presence of throttle degradation. In particular, speed of the electric compressor may be adjusted to follow a choked flow line of a compressor map for the electric compressor so that engine air flow may be controlled while throttle operation may be degraded.

The present description may provide several advantages. Specifically, the approach may provide for improved vehicle drivability during conditions of throttle degradation. Further, the approach may provide for a larger engine operating range during conditions of throttle degradation. Further still, the approach may include additional mitigating actions responsive to electric compressor and throttle degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
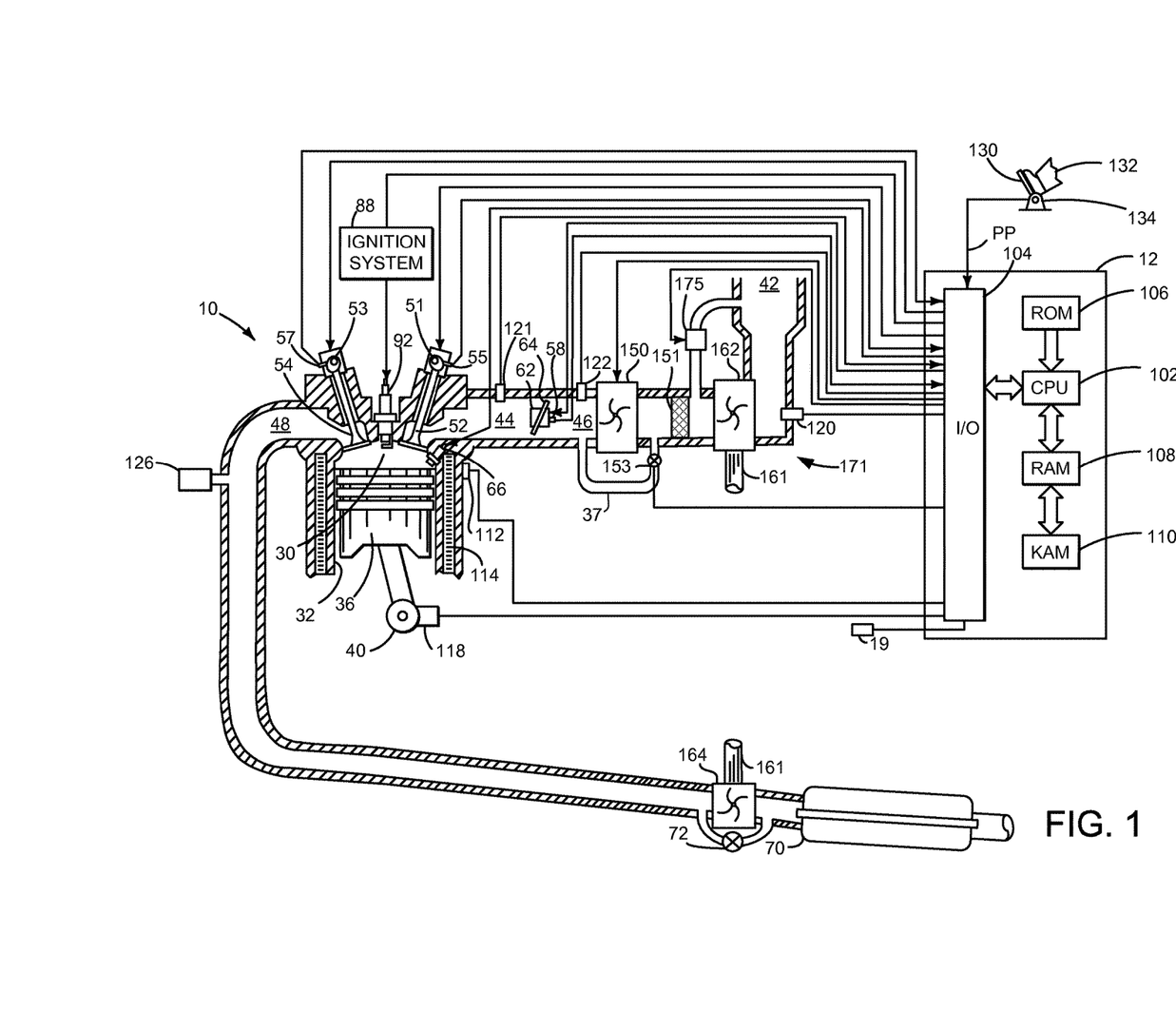
FIG. 1 shows a schematic depiction of an engine.
Figure 2:
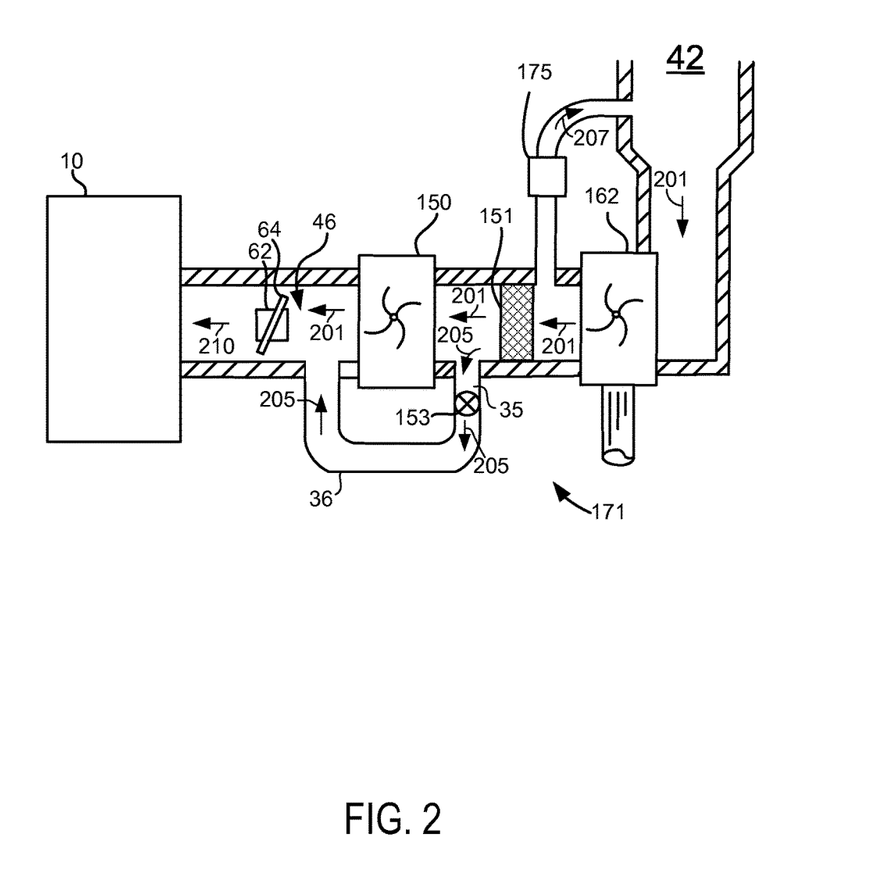
FIG. 2 shows a schematic illustrating engine air flow according to the present description.
Figure 3:
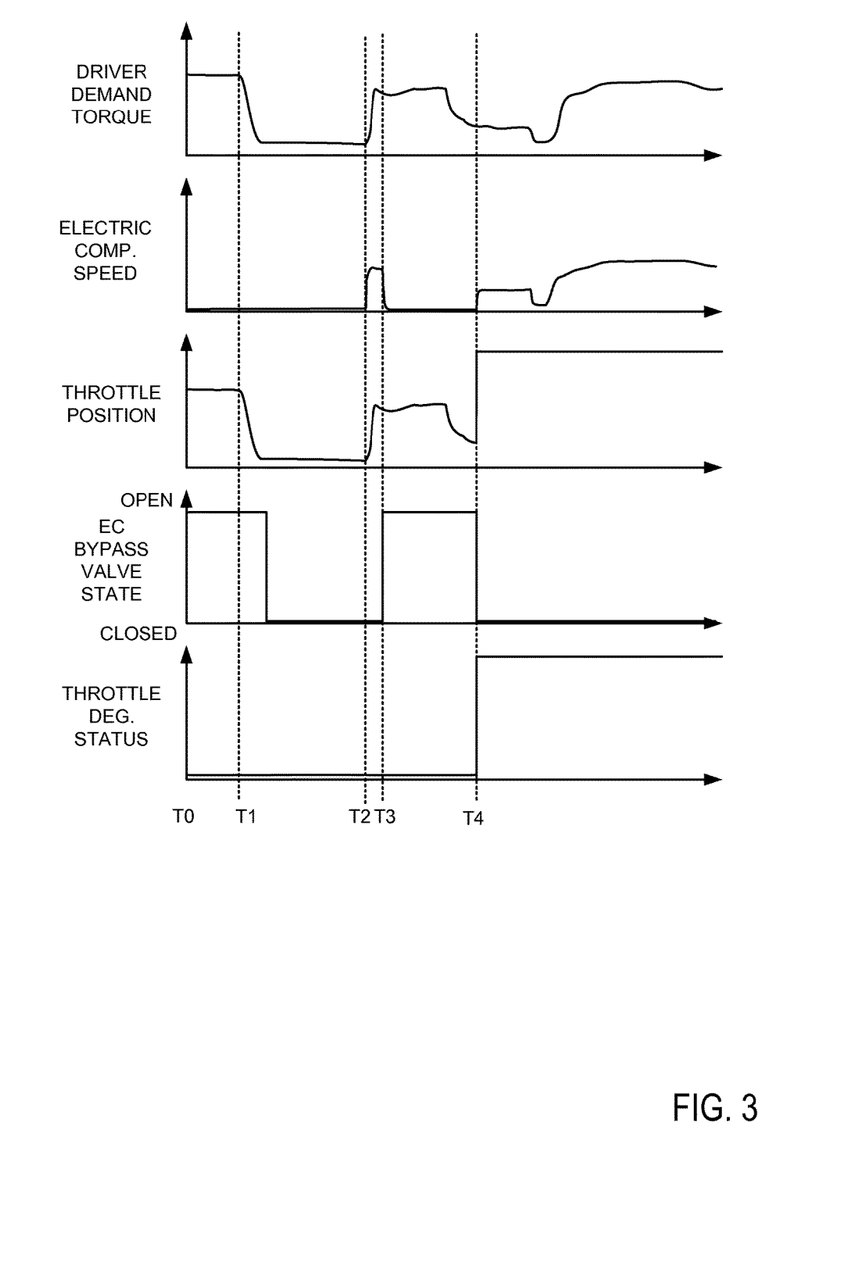
FIG. 3 shows an example engine operating sequence.
Figure 4:
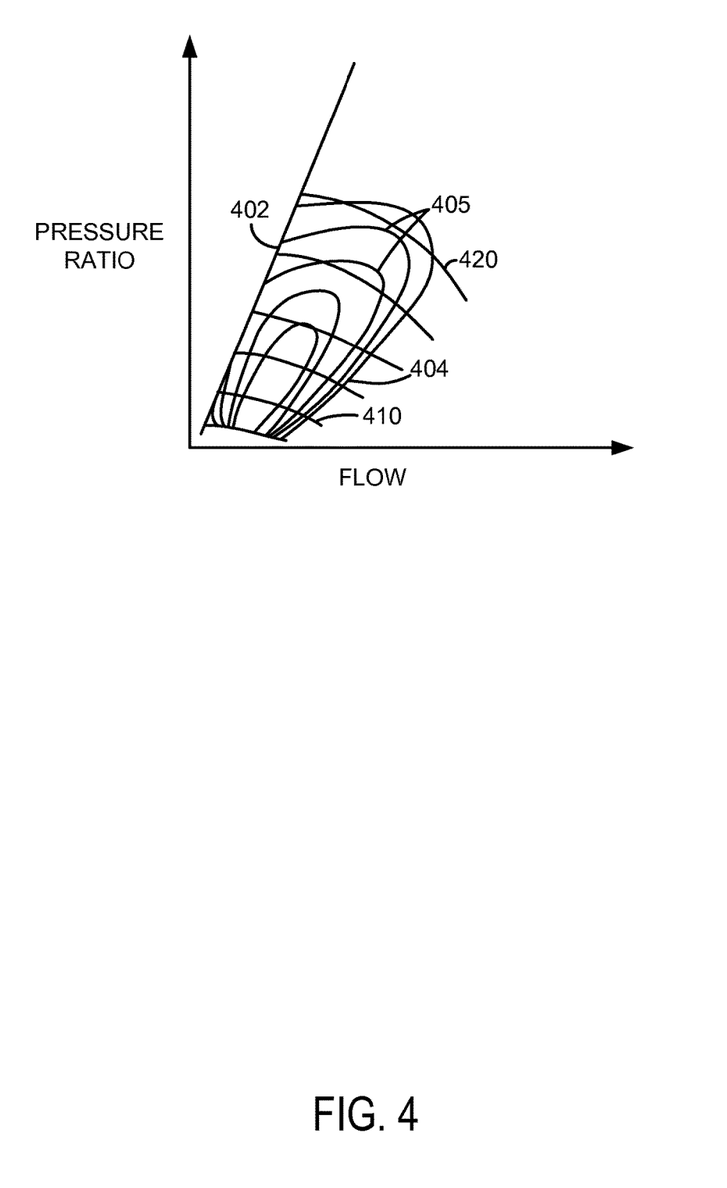
FIG. 4 shows an example compressor map including a choked flow line.
Figure 5:
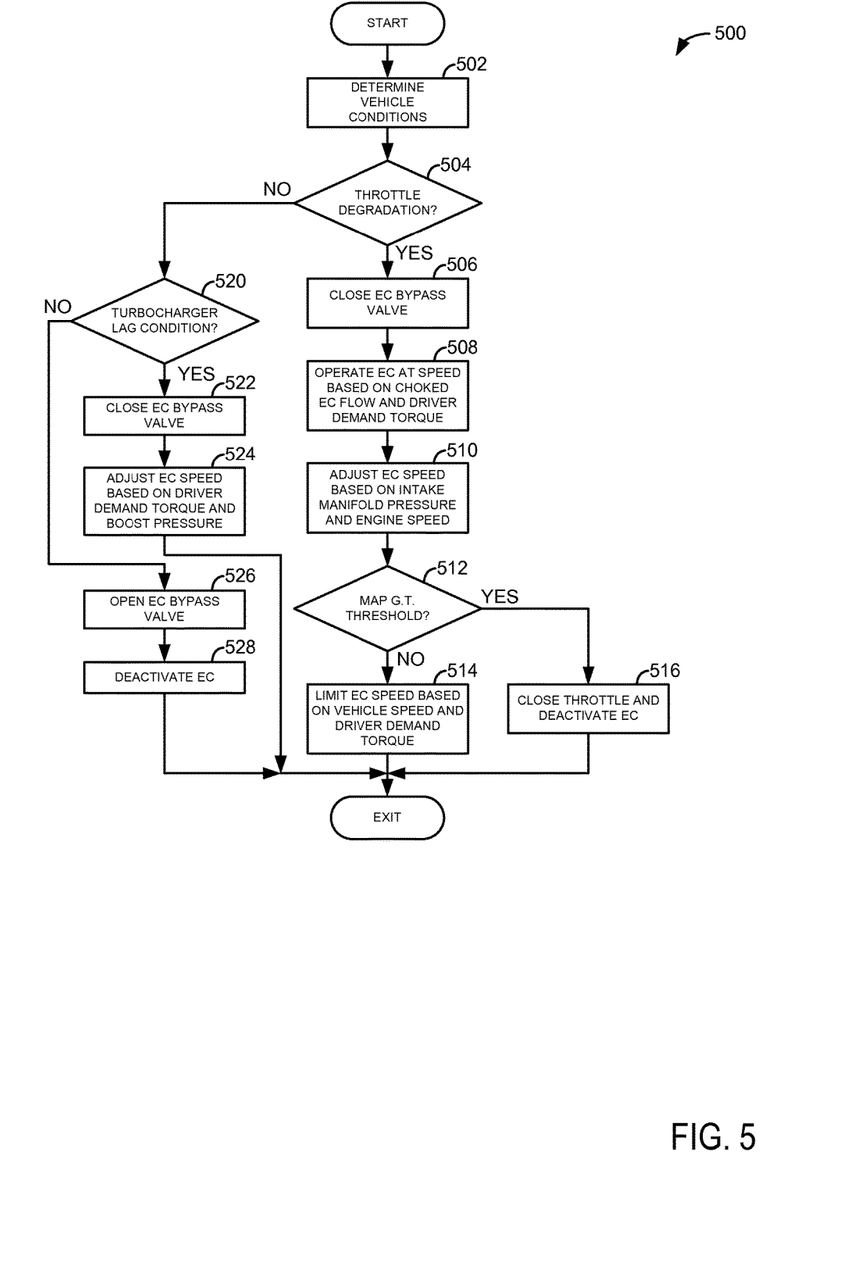
FIG. 5 shows an example method for operating an engine in the presence of throttle degradation.

The present description is related to operating an engine that includes an electrically operated throttle. The throttle may be positioned to a predetermined opening amount and engine air flow may be controlled via adjusting speed of an electric compressor to control engine torque responsive to a driver demand torque. FIG. 1 shows an example engine including two compressors. Air may flow in the engine air intake as shown in FIG. 2. An example engine operating sequence for controlling engine air flow and torque in the presence of throttle degradation is shown in FIG. 3. A choked flow line for a compressor is shown in FIG. 4. Finally, FIG. 5 shows a method for operating an engine in the presence of throttle degradation.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided from controller 12. Fuel is delivered to fuel injector 66 by a fuel system including a fuel tank (not shown), fuel pump (not shown), and fuel rail (not shown). In addition, intake manifold 44 is shown communicating with optional electronic throttle 62 which adjusts a position of throttle plate 64 to control air flow from intake boost chamber 46.

Compressor 162 draws air from engine air inlet 42 to supply boost chamber 46. Exhaust gases spin turbine 164 which is coupled to compressor 162 via shaft 161. Exhaust driven compressor bypass valve 175 may be electrically operated via a signal from controller 12. Compressor bypass valve 175 allows pressurized air to be circulated back to the compressor inlet to limit boost pressure. Similarly, waste gate actuator 72 allows exhaust gases to bypass turbine 164 so that boost pressure can be controlled under varying operating conditions.

Electrically driven compressor 150 may be selectively activated via controller 12. Electrical energy from an electric energy storage devices and/or an alternator (not shown) supplies energy to rotate electrically driven compressor 150. Electrically driven compressor bypass passage 37 includes an electrically driven compressor bypass valve 153 that may be selectively opened to allow air to flow from compressor 162 through charge air cooler 151 and to boost chamber 46 without passing through electrically driven compressor 150. Charge air cooler 151 cools air entering engine air intake 171. Charge air cooler 151 may be an air-to-air cooler or a liquid-to-air cooler.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory (non-transitory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; ambient air humidity from humidity sensor 19; a measurement of engine manifold pressure (MAP) from pressure sensor 121 coupled to intake manifold 44; a measurement of boost pressure or throttle inlet pressure from pressure sensor 122 coupled to boost chamber 46, or alternatively, upstream of electrically driven compressor 150; an engine position sensor from a Hall effect sensor 118 sensing crankshaft 40 position; a measurement of air mass entering the engine from sensor 120 (e.g., a hot wire air flow meter); and a measurement of throttle position from sensor 58. Engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Air flows through the engine from engine air inlet 42 past compressor 162, charge air cooler 151, electrically drive compressor 150, and throttle 62 before entering engine intake manifold 44. Air enters combustion chamber 30 from engine intake manifold 44 before proceeding to exhaust manifold 48 as combustion byproducts or air. Air and/or combustion byproducts are then released to atmosphere after passing turbine 164 and passing through converter 70. Thus, engine air inlet 42 is upstream of compressor 162, charge air cooler 151, electrically driven compressor 150, and combustion chamber 30 according to a direction of air flow through engine 10.

Referring now to FIG. 2, a schematic illustrating engine air flow according to one aspect of the present description is shown. FIG. 2 shows air flow in engine components shown in FIG. 1. Elements shown in FIG. 2 that are labeled with the same numeric values shown in FIG. 1 are the same elements shown in FIG. 1. Further, the elements function in the same way. Therefore, for the sake of brevity, a description of these elements is omitted.

During engine operating conditions where turbocharger lag may be present or throttle degradation, valve 153 may be closed so that air flows from compressor 162 to electrically driven compressor 150 before passing electronic throttle 62. Air flows through engine intake 171 in the direction shown by arrows 201 when valve 153 is closed. Valve 153 may be opened and electrically driven compressor 150 may be deactivated when compressor 162 may provide air flow at or greater than a desired engine air flow. Air flows through engine intake 171 in the direction shown by arrows 205 when valve 153 is open and electrically driven compressor is deactivated. Air flow may be in a direction opposite to that shown by arrows 205 when electrically driven compressor 150 is active and valve 153 is open. Air flows into engine 10 as shown by arrow 210. Air may flow into engine 10 when valve 153 is open or closed.

The speed of electrically driven compressor 150 may be varied via varying electrical current supplied to compressor 150. Varying compressor speed may increase or decrease pressure in boost chamber 46 and increase or decrease pressure between electrically driven compressor and charge air cooler 151. In particular, pressure in boost chamber 46 may be increased when speed of electrically driven compressor 150 is increased. Pressure between electrically driven compressor 150 and charge air cooler may decrease when speed of electrically driven compressor 150 is increased. Conversely, pressure in boost chamber 46 may be decrease from a higher pressure when speed of electrically driven compressor 150 is decreased due to the engine consuming air. Pressure between electrically driven compressor 150 and charge air cooler may increase when speed of electrically driven compressor 150 is decreased or when flow from compressor 162 is greater than flow through electric compressor 150.

Air flow may be in a direction shown by arrow 207 when compressor bypass valve 175 is opened. Bypass valve 175 may be opened when compressor 162 approaches surge conditions (e.g., operating at a low flow rate and mid to high pressure ratio across compressor 162).

Thus, the system of FIGS. 1 and 2 provides for an engine system, comprising: an engine including an air intake and a throttle; an exhaust gas driven turbocharger including turbocharger bypass valve; an electric compressor posited along the air intake downstream of the exhaust gas driven turbocharger and including an electric compressor bypass valve; and a controller including executable instructions stored in non-transitory memory to open the turbocharger bypass valve, close the electric compressor bypass valve, and adjust a speed of the electric compressor in response to an indication of throttle degradation.

In some examples, the engine system further comprises additional instructions to command the throttle closed in response to an intake manifold pressure greater than a threshold. The engine system includes where the speed of the electric compressor is adjusted to follow a choked flow line of a compressor map. The engine system further comprises additional instructions to close the electric compressor bypass valve and activate the electric compressor in response to turbocharger lag in absence of the indication of throttle degradation. The engine system further comprises additional instructions to open a waste gate in response to the indication of throttle degradation. The engine system includes where the speed of the electric compressor is adjusted via adjusting current supplied to the electric compressor.

Referring now to FIG. 3, a prophetic engine operating sequence is shown. The engine operating sequence may be provided by the system of FIG. 1 according to the method of FIG. 5. Vertical lines shown at T0-T4 represent times of particular interest in the sequence. The plots are time aligned and occur at a same time.

The first plot from the top of FIG. 3 is a plot of driver demand torque versus time. The vertical axis represents driver demand torque and driver demand torque increases in the direction of the vertical axis arrow. The horizontal axis represents time and time increases from the left side of the plot to the right side of the plot.

The second plot from the top of FIG. 3 is a plot of electrically driven compressor speed versus time. The vertical axis represents speed of the electrically driven compressor and speed increases in the direction of the vertical axis arrow. The horizontal axis represents time and time increases from the left side of the plot to the right side of the plot.

The third plot from the top of FIG. 3 is a plot of throttle position versus time. The throttle position is fully open when the trace is at a higher level near the vertical axis arrow. The throttle is closed when the trace is at a lower level near the horizontal axis. The horizontal axis represents time and time increases from the left side of the figure to the right side of the figure.

The fourth plot from the top of FIG. 3 is a plot of electrically driven compressor (EC) bypass valve operating state versus time. The vertical axis represents EC bypass valve operating state. The EC bypass valve is open when the trace is at a higher level near the vertical axis arrow. The EC bypass valve is closed when the trace is at a lower level near the horizontal axis. The horizontal axis represents time and time increases from the left side of the figure to the right side of the figure.

The fifth plot from the top of FIG. 3 is a plot of throttle degradation status versus time. The vertical axis represents throttle degradation status and throttle degradation is indicated when the trace is at a higher level near the vertical axis arrow. The horizontal axis represents time and time increases from the left side of the figure to the right side of the figure.

At time T0, the driver demand torque is relatively high and the electric compressor is deactivated. The turbocharger (not shown) may supply pressurized air to the engine during conditions of higher driver demand torque. The throttle position is opened a relatively large amount and the electric compressor bypass valve is open to allow air to flow from the turbocharger compressor to the throttle without passing through the electric compressor. The throttle degradation status is not asserted to indicate throttle degradation is not present.

At time T1, the driver reduces the driver demand torque by at least partially releasing the accelerator pedal. The throttle opening amount is reduced in response to the reduction in driver demand torque. The electrically driven compressor remains deactivated, but the electric compressor bypass valve is closed shortly after the driver demand torque is reduced so that the electric compressor may provide boost assistance for an expected subsequent increase in driver demand torque. The throttle degradation status remains not asserted.

At time T2, the driver demand torque is increased and the electrically driven compressor is activated in response to the increase in driver demand torque. The electrically driven compressor speed is adjusted in response to driver demand torque and boost pressure. By activating the electrically driven compressor, a delay in engine torque resulting from turbocharger lag may be reduced. The throttle degradation status remains not asserted.

At time T3, the engine air flow and flow through the turbocharger reaches a desired engine air flow amount. Therefore, the electrically driven compressor is deactivated and the electrically driven compressor bypass valve is opened. By opening the electrically driven compressor bypass valve and deactivating the electrically driven compressor, engine air flow may be provided solely via the turbocharger compressor without assistance from the electrically driven compressor. In this way, energy consumed to operate the engine may be reduced.

Between time T3 and time T4, the driver demand torque increases slightly and then decreases in response to a driver changing a position of an accelerator pedal. The throttle position is adjusted in response to the driver demand torque and the electric compressor remains deactivated. The electric compressor bypass valve remains open and the throttle degradation state is not asserted. The electric compressor is deactivated as indicated by the low electric compressor speed.

At time T4, throttle degradation is indicated by the throttle degradation status transitioning to a higher level. Throttle degradation may be indicated in response to one or more throttle position sensors outputting a value greater than a first threshold or less than a second threshold. Further, throttle degradation may be indicated in response to engine intake manifold pressure greater than a first threshold value for a present driver demand torque. Alternatively, throttle degradation may be indicated in response to engine intake manifold pressure less than a second threshold value for the present driver demand torque and engine speed.

The electric compressor bypass valve is closed in response to the indication of throttle degradation and the electric compressor is activated as indicated by the increase in electric compressor speed. The throttle is commanded open and the driver demand remains relatively constant. The electric compressor speed is adjusted to provide air flow to the engine that corresponds to the driver demand torque and the compressor speed is based on a choked air flow line of a compressor map as described in further detail below. The electric compressor speed is adjusted in response to the driver demand torque at times after time T4. The electric compressor bypass valve remains closed so that all air flow into the engine passes through the electric compressor.

In this way, the electric compressor speed may be adjusted to provide a desired air flow through the engine to provide a desired engine torque responsive to the driver demand torque. Further, the electric compressor chokes air flow into the engine so that the possibility of excess air flow into the engine may be reduced.

Referring now to FIG. 4, an example compressor operating map for an electric compressor is shown. The vertical axis represents pressure ratio across the compressor. The horizontal axis represents flow rate through the compressor. The compressor efficiency lines 405 indicate regions of compressor efficiency. Line 402 is a compressor surge line where pressure ratios and compressor efficiencies to the left of line 402 represent unstable compressor operation. Line 404 represents a choked flow line where flow through the compressor may not increase above. Lines 410 and 420 represent constant compressor speeds, and line 410 represents a lower compressor speed than line 420. By controlling compressor speed via adjusting current supplied to the compressor in response to driver demand torque, the air flow rate through the compressor may be controlled and limited to follow choked flow line 404 when the engine throttle is fully open. In this way, air flow through the engine may be restricted to be less than air flow corresponding to the air flow of the choked flow line 404.

Referring now to FIG. 5, an example method for operating an engine in the presence of throttle degradation is shown. At least portions of the method of FIG. 5 may be incorporated to controller 12 in the system of FIG. 1 as executable instructions stored in non-transitory memory. Further, portions of the method of FIG. 5 may be actions taken by controller 12 in the physical world to transform vehicle operating states via one or more actuators or sensors. Additionally, in some examples, one or more steps shown in FIG. 5 may be omitted and the remaining steps of method of FIG. 5 may be performed. The method of FIG. 5 may provide the operating sequence shown in FIG. 3.

At 502, method 500 determines vehicle conditions including but not limited to driver demand torque, throttle inlet pressure, desired engine air flow, engine speed, ambient humidity, ambient air temperature, and intake air temperature are determined via querying the various sensors shown in FIG. 1. In one example, method 500 determines driver demand torque based on looking up empirically determined torque values based on accelerator pedal position and vehicle speed. Method 500 proceeds to 504 after operating conditions are determined.

At 504, method 500 judges if throttle degradation is present. In one example, method 500 may judge if throttle degradation is present based on output of one or more throttle position sensors. For example, if output of a throttle position sensor is greater than a threshold, throttle degradation may be judged present. Further, if engine intake manifold pressure is greater than an expected value by more than a threshold pressure, method 500 may judge throttle degradation is present. If method 500 judges that throttle degradation is present, the answer is yes and method 500 proceeds to 506. Otherwise, the answer is no and method 500 proceeds to 520.

At 506, method 500 closes the electric compressor bypass valve. The electric compressor bypass valve is fully closed so that all air entering the engine through the engine air intake has to pass through the electric compressor. In this way, the electric compressor 400 may control air flow into the engine. Further, method 500 may command the engine throttle fully open at 506 to allow the electric compressor to control engine air flow. In some examples, a turbocharger waste gate and compressor bypass valve may be commanded open to provide the electric compressor additional control of air flowing into the engine. Method 500 proceeds to 508 after the electric compressor bypass valve is closed.

At 508, method 500 activates the electrically driven compressor or supercharger (EC). Further, method 500 adjusts a speed of the electrically driven compressor in response to driver demand torque, electric compressor pressure ratio, and desired engine air flow. In one example, the driver demand torque is determined from empirically determined torque values that are stored in a table that is indexed based on accelerator pedal position and vehicle speed. The driver demand torque is then converted into an engine air flow amount. The engine air flow amount is based on empirically determined engine air flows stored in a table in memory. The table is indexed via engine speed and driver demand torque, and the table outputs an engine air flow value at which the engine outputs the driver demand torque operating with minimum spark for best torque and a stoichiometric air-fuel ratio. The engine air flow value is used to determine a speed command for the electric compressor. In particular, electric compressor speed command is determined from a compressor map that is indexed based on the engine air flow determined from driver demand torque and the pressure ratio across the electric compressor. The compressor map may be of the type shown in FIG. 4. The compressor map outputs an electric compressor speed value where flow through the compressor is choked. In particular, the compressor speed value in the table that provides the engine air flow while the electric compressor operates on the choked flow line of the compressor map is output from the table. The electric compressor speed command is adjusted to the speed output from the table. Method 500 proceeds to 510 after compressor speed command is adjusted to a speed that chokes air flow through the electric compressor at a flow rate that provides the driver demand torque.

At 510, method 500 adjusts the electric compressor speed command to provide an intake manifold pressure that corresponds to the engine air flow rate determined at 508. The intake manifold pressure for a four cylinder engine may be determined based on engine speed, engine displacement, and air temperature via the following equation:

$$Mc = \frac{D}{4RT} \cdot \eta(N, L) \cdot Pm$$

where Mc is mass charge of the cylinder and it is based on the engine air flow and engine speed, D is engine displacement, R is the gas constant, T is air temperature, Pm is intake manifold pressure, N is engine speed, L is engine load, and η is empirically determined engine volumetric efficiency. If intake manifold pressure determined via a pressure sensor (measured intake manifold pressure) is different than intake manifold pressure based on engine air flow based on driver demand torque, electric compressor speed may be adjusted responsive to the difference in measured and intake manifold pressure and intake manifold pressure based on driver demand torque. In particular, the difference in intake manifold pressure may be multiplied by a gain value (e.g., scalar) and electric compressor speed is modified by the result. In some examples, step 510 may be omitted. Method 500 proceeds to 512 after electric compressor speed command is adjusted responsive to intake manifold pressure.

At 512, method 500 judges if intake manifold absolute pressure (MAP) is greater than (G.T.) a threshold pressure. The threshold pressure may be based on and vary with engine speed. If method 500 judges that intake manifold pressure is greater than the threshold pressure, the answer is yes and method 500 proceeds to 516. Otherwise, the answer is no and method 500 proceeds to 514.

At 516, method 500 commands the throttle closed and deactivates the electric compressor. When the throttle is closed it may allow a small amount of air into the engine so that the vehicle may creep at a slow speed. Further, the electric compressor bypass valve may be opened. Method 500 proceeds to exit after the throttle is closed and the electric compressor is deactivated.

At 514, method 500 limits electric compressor speed to less than a threshold speed based on driver demand torque and vehicle speed. In one example, empirically determined electric compressor speeds are entered in a table in memory and the table is indexed based on driver demand torque and vehicle speed. The electric compressor speed command is limited to a value less than the value extracted from the table. The electric compressor speed command is output to the electric compressor after being limited. The throttle closed and deactivates the electric compressor. When the throttle is closed it may allow a small amount of air into the engine so that the vehicle may creep at a slow speed. Further, the electric compressor bypass valve may be opened. Method 500 proceeds to exit after the throttle is closed and the electric compressor is deactivated.

At 520, method 500 judges whether or not turbocharger lag or delay conditions are present. Conditions for turbocharger lag may be present when turbocharger compressor speed is lower than a threshold speed and when driver demand torque is higher than a threshold and/or increasing. The turbocharger may not be able to instantaneously increase engine air flow in response to an increase in driver demand torque when turbocharger compressor speed is low due to turbocharger inertia and air flow delays through the engine. If method 500 judges that turbocharger lag conditions are present, the answer is yes and method 500 proceeds to 522. Otherwise, the answer is no and method 500 proceeds to 526.

At 522, method 500 closes the electric compressor bypass valve. The electric compressor bypass valve is closed so that the electric compressor may build pressure in the boost chamber downstream of the electric compressor and upstream of the throttle. Further, closing the electric compressor bypass valve directs all engine air flow through the electric compressor. Method 500 proceeds to 524 after the electric compressor bypass valve is closed.

At 524, method 500 activates the electric compressor and adjusts its speed. In one example, the electric compressor speed is adjusted as a function of the driver demand torque and boost pressure (e.g., pressure upstream of the throttle). For example, driver demand torque may be used to index a table or function that outputs an empirically determined electric compressor speed. The electric compressor speed may be further adjusted in response to boost pressure. For example, if boost pressure is less than a desired boost pressure determined from driver demand torque, the electric compressor speed may be increased. If boost pressure is greater than the desired boost pressure, the electric compressor speed may be decreased. Method 500 proceeds to exit after the electric compressor speed has been adjusted.

At 526, method 500 opens the electric compressor bypass valve. The electric compressor bypass valve is opened so that air may flow directly from the turbocharger compressor to the throttle without passing through the electric compressor. Bypassing the electric compressor may improve engine efficiency during some conditions.

At 528, method 500 deactivates the electric compressor by ceasing to flow current to the electric compressor. In this way, electric energy may be conserved when the turbocharger compressor is at a desired speed. Method 500 proceeds to exit after deactivating the electric compressor.

In this way, the speed of the electric compressor may be controlled in response to driver demand torque to limit engine torque production while providing engine torque to propel a vehicle during a range of driving conditions and driver demand torques. Consequently, a driver may be able to proceed to a service area during conditions of throttle degradation under power provided by the engine.

Thus, the method of FIG. 5 provides for a method for operating an engine via a controller in combination with a throttle, comprising: commanding the throttle to a position via the controller in response to an indication of throttle degradation; and activating an electric compressor via the controller in response to the indication of throttle degradation. The method includes where the indication of throttle degradation is a throttle sensor output that is greater than a threshold value. The method includes where the indication of throttle degradation is an intake manifold pressure greater than a threshold value. The method includes where the electric compressor is positioned in an intake manifold downstream of a turbocharger compressor. In some examples, the method further comprises closing an electric compressor bypass valve in response to the indication of throttle degradation. The method includes where the throttle is commanded to an open position. The method includes where the open position is a fully open position.

The method of FIG. 5 also provides for a method for operating an engine via a controller in combination with a throttle, comprising: adjusting a speed of an electric compressor via the controller for air flow through the electric compressor to follow a choked flow line of a compressor map in response to an indication of throttle degradation and a driver demand torque. The method further comprises closing an electric compressor bypass valve in response to the indication of throttle degradation. The method further comprises commanding the throttle open in response to the indication of throttle degradation. The method also includes where the indication of throttle degradation is based on output of a throttle sensor or an intake manifold pressure sensor. The method includes where the speed of the electric compressor is increased responsive to the driver demand torque increasing. The method includes where the electric compressor is positioned along an engine air intake downstream of a turbocharger. The method further comprises adjusting the speed of the electric compressor to provide a desired intake manifold pressure.

As will be appreciated by one of ordinary skill in the art, the methods described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating an engine via a controller in combination with a throttle, comprising:
    commanding the throttle to a position via the controller in response to an indication of throttle degradation; and
    open a turbocharger bypass valve, close an electric compressor bypass valve, and adjust a speed of an electric compressor in response to the indication of throttle degradation.

2. The method of claim 1, where the indication of throttle degradation is a throttle sensor output that is greater than a threshold value.

3. The method of claim 1, where the indication of throttle degradation is an intake manifold pressure greater than a threshold value.

4. The method of claim 1, where the electric compressor is positioned in an intake manifold downstream of a turbocharger compressor.

5. The method of claim 1, where the throttle is commanded to an open position.

6. The method of claim 5, where the open position is a fully open position.

7. A method for operating an engine via a controller in combination with a throttle, comprising:
    adjusting a speed of an electric compressor via the controller for air flow through the electric compressor to follow a choked flow line of a compressor map in response to an indication of throttle degradation and a driver demand torque, wherein a compressor speed command is generated based on engine air flow while the electric compressor operates on the choked flow line of the compressor map; and
    choking the air flow with the electric compressor by maintaining an electric compressor bypass valve in a closed position.

8. The method of claim 7, further comprising closing the electric compressor bypass valve in response to the indication of throttle degradation.

9. The method of claim 7, further comprising commanding the throttle open in response to the indication of throttle degradation.

10. The method of claim 7, where the indication of throttle degradation is based on output of a throttle sensor or an intake manifold pressure sensor.

11. The method of claim 7, where the speed of the electric compressor is increased responsive to the driver demand torque increasing.

12. The method of claim 7, where the electric compressor is positioned along an engine air intake downstream of a turbocharger.

13. The method of claim 7, further comprising adjusting the speed of the electric compressor to provide a desired intake manifold pressure.

14. An engine system, comprising:
    an engine including an air intake and a throttle;
    an exhaust gas driven turbocharger including a turbocharger bypass valve;
    an electric compressor positioned along the air intake downstream of the exhaust gas driven turbocharger and including an electric compressor bypass valve; and
    a controller including executable instructions stored in non-transitory memory to open the turbocharger bypass valve, close the electric compressor bypass valve, and adjust a speed of the electric compressor in response to an indication of throttle degradation.

15. The engine system of claim 14, further comprising additional instructions to command the throttle closed in response to an intake manifold pressure greater than a threshold.

16. The engine system of claim 14, where the speed of the electric compressor is adjusted to follow a choked flow line of a compressor map.

17. The engine system of claim 14, further comprising additional instructions to close the electric compressor bypass valve and activate the electric compressor in response to turbocharger lag in absence of the indication of throttle degradation.

18. The engine system of claim 14, further comprising additional instructions to open a waste gate in response to the indication of throttle degradation.

19. The engine system of claim 14, where the speed of the electric compressor is adjusted via adjusting current supplied to the electric compressor.

* * * * *